United States Patent [19]

Kapsales et al.

[11] Patent Number: 5,649,003
[45] Date of Patent: Jul. 15, 1997

[54] METHOD IN A COMMUNICATIONS SYSTEMS FOR PROVIDING AN OUT-OF-BAND SIGNALING RESPONSE BASED ON PREDETERMINED CONDITIONS

[75] Inventors: Peter Kapsales, Woodinville, Wash.; Barry S. Seip, New Providence, N.J.

[73] Assignee: AT&T, Middletown, N.J.

[21] Appl. No.: 395,009

[22] Filed: Feb. 27, 1995

[51] Int. Cl.[6] .................. G08B 13/00; H04M 11/00
[52] U.S. Cl. .................. 379/201; 379/42; 379/67
[58] Field of Search .................. 379/201, 211, 379/210, 67, 396, 57, 58, 59, 61, 42, 40, 39, 50, 51, 56; 340/531, 539

[56] References Cited

U.S. PATENT DOCUMENTS

| | | | |
|---|---|---|---|
| 4,277,649 | 7/1981 | Sheinbein | 379/67 |
| 4,313,035 | 1/1982 | Jordan | 379/67 |
| 4,642,425 | 2/1987 | Guinn, Jr. et al. | 379/57 |
| 4,658,416 | 4/1987 | Tanaka | 379/170 |
| 5,029,196 | 7/1991 | Morganstein | 379/210 |
| 5,197,096 | 3/1993 | Sakuma | 379/396 |
| 5,199,062 | 3/1993 | Van Meister et al. | 379/67 |
| 5,239,577 | 8/1993 | Bates et al. | 379/201 |
| 5,257,307 | 10/1993 | Ise | 379/57 |
| 5,276,731 | 1/1994 | Arbel et al. | 379/88 |
| 5,307,399 | 4/1994 | Dai et al. | 379/57 |
| 5,327,486 | 7/1994 | Wolff | 379/211 |
| 5,329,578 | 7/1994 | Brennan | 379/211 |
| 5,375,161 | 12/1994 | Fuller et al. | 379/57 |
| 5,402,466 | 3/1995 | Delahanty | 379/57 |
| 5,428,663 | 6/1995 | Grimes et al. | 379/58 |
| 5,430,791 | 7/1995 | Feit | 379/67 |
| 5,459,773 | 10/1995 | Hwang | 379/57 |

FOREIGN PATENT DOCUMENTS

PCTUS90/
06729 11/1990 WIPO .................. H04M 11/00

*Primary Examiner*—Krista M. Zele
*Assistant Examiner*—Thomas Forrest Presson
*Attorney, Agent, or Firm*—Robert B. Levy

[57] ABSTRACT

A method for use in a communications system permitting a first party connected to a central platform to receive an out-of-band signal in response to predetermined trigger conditions. In accordance with one aspect of the invention, leaving a voice mail message results in an automatic page to the first party notifying him, or her, of the voice mail message from a second party. Similarly, the first party is notified of alert or alarm conditions and preprogrammed schedule changes through use of the out-of-band signal. Certain predetermined characters may be used to distinguish between the various types of out-of-band messages sent to the first party.

11 Claims, 3 Drawing Sheets

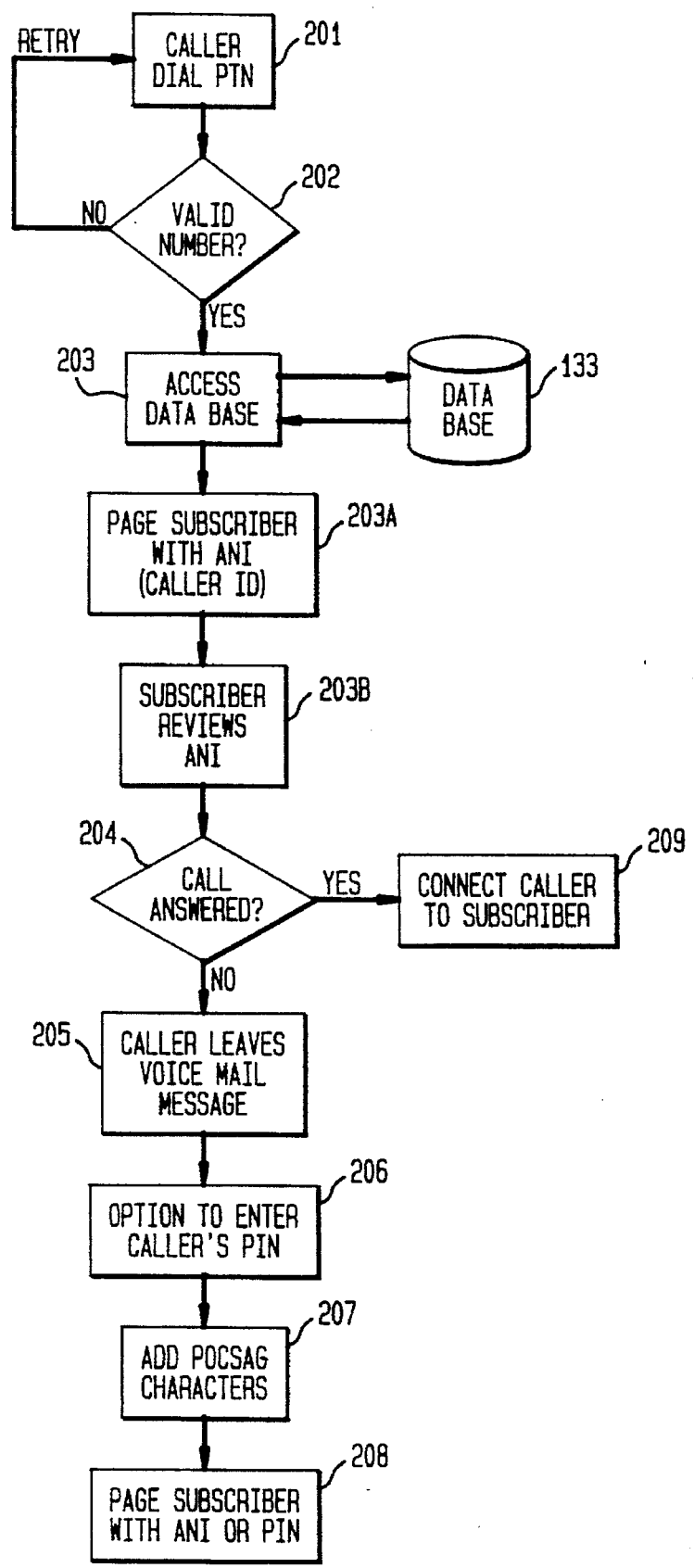

METHOD IN A COMMUNICATIONS SYSTEMS FOR PROVIDING AN OUT-OF-BAND SIGNALING RESPONSE BASED ON PREDETERMINED CONDITIONS

TECHNICAL FIELD

This invention relates to personal communications and, more particularly, to a method in a communications system for providing an out-of-band signaling response on an ancillary path based on predetermined conditions.

BACKGROUND OF THE INVENTION

Personal communication service (PCS) is a service in which subscribers, rather than locations or telephone stations, are assigned a personal telephone number. Calls placed to a subscriber's personal telephone number are routed to the subscriber at a telephone near that subscriber's current location. In order to provide a subscriber with such a personal communication service, e.g., as disclosed in U.S. Pat. No. 4,313,035, issued to Jordan, et al, the system providing the service (PCS system) must be supplied with the telephone number of a telephone near the subscriber's current location to which it should route calls placed to his personal telephone number. Each time the subscriber changes his location, the telephone number to which calls placed to his personal telephone number are routed must be changed. This requires the subscriber to call into the PCS system and to supply the telephone number to which his calls should currently be routed. Constantly having to call in to the PCS system can be tiresome, and supplying a ten-digit telephone number each time a subscriber changes his location is cumbersome.

To overcome these drawbacks, one prior art solution is to program a sequence of telephone numbers at any one of which the personal telephone service subscriber might be reached. The telephone numbers in a sequence are typically those of locations where a person is likely to be at various times throughout the day, such as "home," "car phone," "office," "pager," etc. When a call is made to the subscriber's personal telephone number, the PCS system attempts to complete the call by sequentially routing the call to each telephone number of the sequence. This process continues until: (a) the call is answered; (b) the call is abandoned; (c) the line associated with the telephone number is determined to be busy; or (d) until a predetermined period of time has elapsed. However, requiring the sequence of calls to be set by the subscriber in advance, and being the same for all callers, is inflexible.

Certain existing systems also offer various alternative means to attempt to reach a subscriber should the sequential routing of the call not be successful including, of course, the well known use of voice mail, E-mail, etc. However, such alternative means are not always successful when the need for rapid communication is necessary, as a subscriber is usually unaware he, or she, has received a voice mail message until the subscriber checks the voice mail center.

Another problem occurs when the central platform automatically redirects calls to a subscriber, based on preprogrammed subscriber schedule changes. Often, a subscriber may forget the preprogrammed automatic schedule changes, and be unaware that his or her calls are being redirected unless reminded that a schedule change has occurred.

The instant invention solves these problems through the use of an out-of-band signaling scheme on an ancillary signaling path that immediately alerts a subscriber to incoming calls, voice mail messages and schedule changes, as well as certain alarm conditions.

A related applicaiton of interest is Ser. No. 08/023,223, filed on Feb. 26, 1993, and allowed on Nov. 15, 1994, which patent is assigned to the same assignee as is the instant application.

SUMMARY OF THE INVENTION

The instant invention is directed to a method in a communications system which provides an out-of-band signaling response to a subscriber under predetermined conditions.

In accordance with the invention, a subscriber receives a message, for example, upon call set-up of an incoming telephone call and/or upon receipt of a voice mail message at a central platform to which the subscriber is connected, thereby immediately alerting the subscriber to the caller ID of the incoming call, or the receipt of the voice mail message.

In accordance with another aspect of the invention, the subscriber also receives a message when certain alarm conditions, or when preset schedule changes, are detected by the central platform.

The invention also provides for the ability to differentiate between various types of paging signals by adding predetermined characters available in the air interface protocol to each page when required.

It is an advantage and general feature of the invention that permitting out-of-band signaling upon detection of certain conditions permits rapid and improved communication between a caller and a subscriber.

BRIEF DESCRIPTION OF THE DRAWINGS

In the drawings:

FIGS. 2A and 2B illustrate use of an out-of-band signaling scheme in accordance with the principles of the invention.

DETAILED DESCRIPTION

Figure 1:
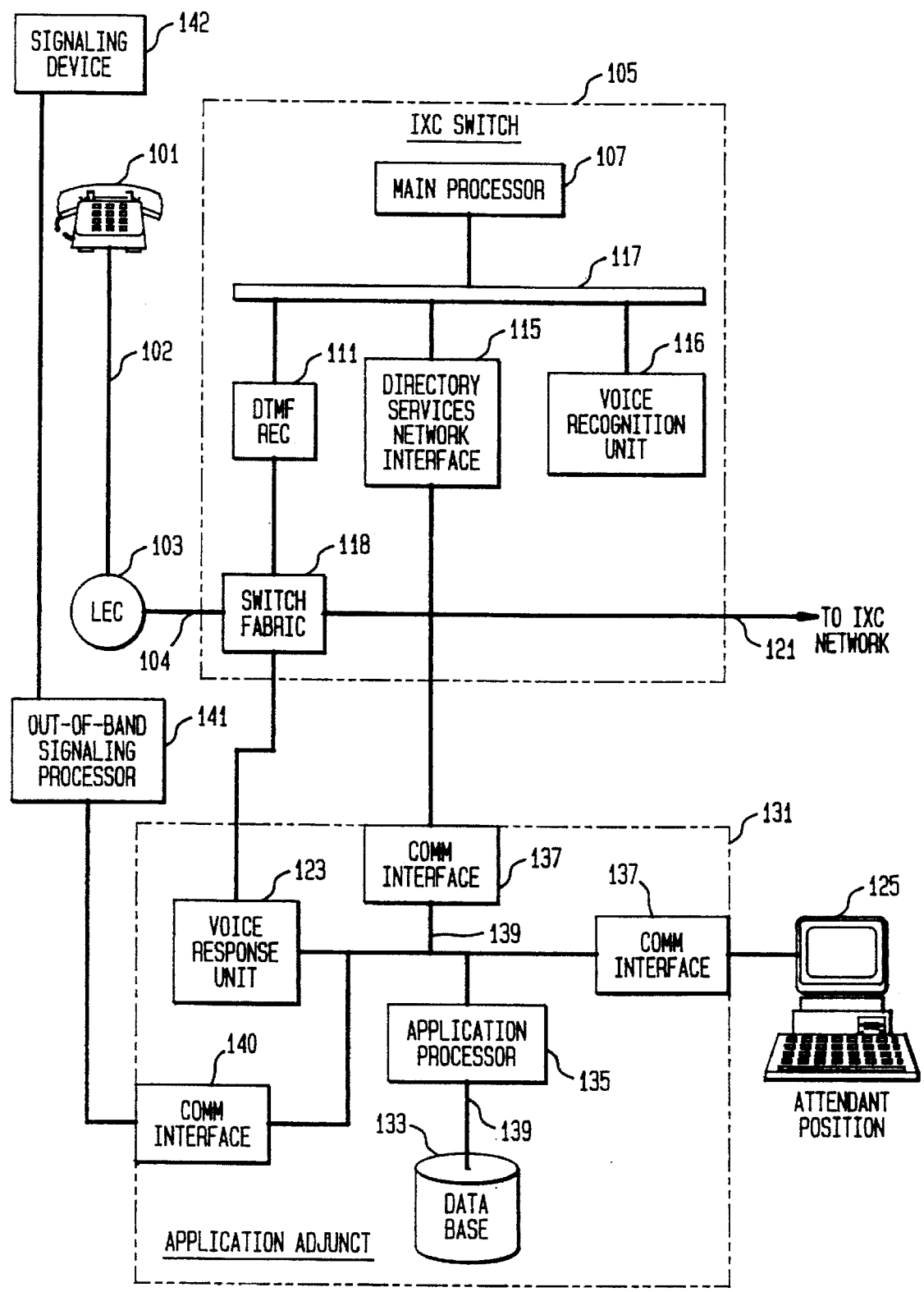
FIG. 1 shows an exemplary embodiment of a system for providing personal communication services in accordance with the principles of the invention.

Referring now to FIG. 1, there is shown an exemplary embodiment of a PCS system in accordance with the principles of the invention. Shown are: (a) telephone station 101, from which calls to a personal telephone number, or any other number, may be originated or received; (b) telephone line 102, of telephone station 101; (c) local exchange carrier (LEC) 103; (d) IXC switch 105; (e) application adjunct 131; and (f) attendant position 125.

Application adjunct 131 performs the necessary processing for: (1) storing an association between (a) a telephone number, (b) a pre-defined, mnemonic tag, and (c) a corresponding identifier; (2) developing and storing sequences of telephone numbers for PCS calls, which may be referred to herein as "quick sequences;" (3) associating quick sequences with the telephone numbers of potential calling telephones; and (4) supplying the telephone numbers of destinations to which IXC switch 105 should handle a call placed to a subscriber's personal telephone number, in accordance with the principles of the invention. Application adjunct 131 includes: (a) application processor 135; (b) data base 133; (c) voice response unit 123; and (d) communication interface 137. Application processor 135 controls the overall operation of application adjunct 131 by performing any necessary processing and exchanging messages with the other components of application adjunct 131 over links 139. Links 139 convey information in digital form and need not all be of the same type or speed, e.g., one may be ethernet link, while the others may be RS-232C links. Data base 133 stores the information required by application processor 135 to control application adjunct 131, e.g., program code and data.

Voice response unit 123 can make various announcements which can be heard by the calling party. The information necessary for making announcements, or combinative portions thereof, may be prestored in voice response unit 123. Such combinative portions may include caller instruction messages for use during call placement, e.g., "press 1 to talk to your party; press 2 to leave a voice mail message, etc.", and other announcements to be described below. In one embodiment, the announcements are accessed by supplying voice response unit 123 with pointers to them. Voice response unit 123 is connected to switch fabric 118, so that the announcements may be routed to subscribers connected to application adjunct 131.

Communication interface 137 translates information for communication between application adjunct 131, and devices external to application adjunct 131. Attendant position 125, staffed by a human attendant, interfaces with application adjunct 131 to handle any questions that a subscriber or caller may have, or any problems that may arise.

IXC switch 105 includes: (a) main processor 107; (b) dual tone multi-frequency receiver (DTMF REC) 111; (c) directory services network interface 115; (d) bus 117; (e) switch fabric 118, and (f) optional voice recognition unit 116. Main processor 107 controls the overall operation of IXC switch 105 by performing any necessary processing and exchanging messages with the other components of IXC switch 105 over bus 117. Dual tone multi-frequency receiver (DTMF REC) 111 receives dual tone multi-frequency signals that are transmitted in response to the pressing of keys on the keypad of telephone station 101, and supplies the digit corresponding to each pressed key to main processor 107. IXC switch 105 also receives the caller's Automatic Number Identification (ANI) signal from LEC 103 in the conventional manner.

Directory services network interface 115 is a protocol conversion unit that permits IXC switch 105 to communicate with application adjunct 131. It is responsible for formatting all messages transmitted to, and for extracting responses received from, application adjunct 131. Such messages include: (a) a message from IXC switch 105, indicating the ANI of the calling telephone; and (b) a message from application adjunct 131, indicating which destination telephone number the PCS call should presently be routed to. In one embodiment, the link between directory services network interface 115, and application adjunct 131, uses the well-known X.25 protocol.

Switch fabric 118 can connect the trunk on which the subscriber's call arrived at IXC switch 105, e.g., trunk 104 to: (a) dual tone multi-frequency receiver (DTMF REC) 111; (b) voice recognition unit 116; (c) voice response unit 123; or (d) to the rest of the interexchange carrier's network, via link 121. Some of the purposes of such connections are described further below.

In one embodiment of the invention, for ease of use and administration, each telephone number to which PCS calls can be routed to is stored in association with a pre-defined, mnemonic tag, and a corresponding identifier. Table 1 shows an exemplary list of such tags and their corresponding identifiers. In this embodiment, Table 1 is stored in data base 133. Table 1 may be implemented as an array in which the tags are the elements of the array and the identifiers are the corresponding indices into the array. Text-to-speech conversion may be used to speak the tags or, alternatively, there may also be stored pointers to information representing stored speech for each tag. The information representing speech may be stored in voice response unit 123, as noted.

TABLE 1

| TAG | IDENTIFIER |
|---|---|
| Home | 01 |
| Office | 02 |
| Secretary | 03 |
| Car Phone | 04 |
| Wife | 05 |
| Husband | 06 |
| AT&T Voice Mail | 07 |
| AT&T Voice Mail With Pager | 08 |
| AT&T Pager | 09 |
| Spouse | 10 |
| Roommate | 11 |
| Children | 12 |
| Neighbor | 13 |
| Mother | 14 |
| Father | 15 |
| Parents | 16 |

Table 2 shows an exemplary table in which identifiers are associated with telephone numbers for a particular PCS subscriber having a unique personal telephone number. In one exemplary embodiment, the telephone numbers are stored in data base 133, as elements of an array, one array for each subscriber, and the identifiers are the corresponding indices into the array. The array may be stored in a compressed form.

TABLE 2

| IDENTIFIER | TELEPHONE # |
|---|---|
| 01 | 5559742211 |
| 02 | 5559497777 |
| 03 | 5559492211 |
| 04 | 5554152219 |
| 05 | |
| 06 | |
| 07 | 8005558100 |
| 08 | 8005554444 |
| 09 | 8005552312 |
| 10 | |
| 11 | |
| 12 | 2213861599 |
| 13 | |
| 14 | 8334429181 |
| 15 | |
| 16 | |

The stored associations between tags and telephone numbers are used to create a sequence of locations to which the calls to a subscriber's personal telephone number should be routed. Again, such a sequence of destinations is known as "quick sequence." Each of a subscriber's quick sequences has a quick sequence number identified as a unique designation.

Data base 133 is also used to store schedule changes which an be preprogrammed by the subscriber, as well as to store certain alarm functions.

For example, the subscriber may want to redirect incoming telephone calls from the office to the home, beginning at 6 p.m., or may program the central platform to direct calls to a hotel or a client's office at a particular point in order to be contacted during a business meeting. Once programmed, the central platform will automatically redirect such calls at the appointed time.

Subscribers may also want to be notified at a particular time to remind them of a doctor's appointment, or an important conference call. Such alarm functions can be preprogrammed and stored in data base 133.

The instant invention is directed to providing an out-of-band signaling response, such as a page, to a subscriber under predetermined conditions. The page can send, for example, a caller's ANI (Automatic Number Identification), or a caller may override the ANI by entering a PIN (Personal Identification Number), which will be displayed on the subscriber's pager unit instead of the caller's ANI.

The instant invention is also directed to notifying a subscriber when calls are going to be redirected by the central platform, for example, forwarded from office to home at 6:00 p.m. Such schedule changes will result in the subscriber getting a page, either numeric or alphanumeric, to remind them of the schedule change. Similarly, a subscriber can be notified under certain alarm conditions, such as a doctor's appointment, or other preprogrammed conditions, at which time the subscriber will again be sent a numeric or alphanumeric page to remind them of the alarm condition.

The out of band signaling response anticipated by the invention is provided via communications interface 140, which is tested when such a response is required. Communications interface 140 activates out-of-band signaling processor 141, which generates the out-of-band signal which is transmitted to signaling device 142. The signaling device 142, in turn, alerts the subscriber to an out-of-band message as described below. Although a page is described herein as one example of an out-of-band signaling response, it is to be understood that other out-of-band signals can be transmitted to a subscriber.

It is, of course, understood that the use of a pager to display many different types of information can cause confusion. For example, if the number 949-2533 were displayed as a result of a page, it could have several meanings. Among other things, it could mean the subscriber received a page requesting a callback on that number, it could mean that the displayed number was the ANI of a caller who had left a voice mail message, it could be an alarm function telephone number, or it could be a caller ID or PIN number.

To separate and distinguish these various types of pages, a convention has been developed using available characters from an alphanumeric or numeric air interface protocol (e.g., POCSAG). For example, this convention tells a subscriber if [ ] (brackets) surround a number it is the ANI of a caller who has left a voice mail message. Similarly, if — (dashes) surround a number, it is the caller's ANI or PIN number, or if just the number is displayed, it is a normal page. An example of a convention that has been developed using the POCSAG air interface protocol for characters is shown in Table 3.

TABLE 3

| Displayed On Pager | Meaning |
| --- | --- |
| [908-555-1212] | ANI of caller who left voice mail |
| -908-555-1212- | ANI or PIN of Caller (Caller ID) |
| 908-555-1515 | Numeric Page |
| [[908-555-1212 | Dial Back Number for Meet-Me Bridge |

Turning now to FIG. 2A, there is shown the situation wherein a subscriber will automatically be paged should a caller leave a voice mail message.

At step 201, the caller dials the PTN (Personal Telephone Number) of the subscriber. Step 202 checks to see if the PTN is a valid number and, if not, the caller is given the opportunity to retry the number. Assuming that the number is valid, the sequence moves to step 203, where data base 133 is accessed to determine the preprogrammed calling sequence that has been stored in data base 133.

The subscriber is paged with the caller's ANI (surrounded by dashes) in 203a. The subscriber reviews the page at step 203b and determines if the call should be answered.

The preprogrammed calling sequence will be followed and, if the call is answered at step 204, the system will connect the caller to the subscriber at step 209.

If the call is not answered, the caller has the option of leaving a voice mail message at step 205. Step 206 gives the caller the option of paging the subscriber with his or her PIN, as opposed to sending the caller's ANI to the subscriber. At step 207, the additional POCSAG characters are added, if necessary, as described above, and finally the subscriber is paged at step 208.

In this manner, the subscriber automatically receives an out-of-band signaling response (i.e., a page) upon receipt of a voice mail message so that rapid communication can be achieved between the caller and the subscriber.

Figure 2B:
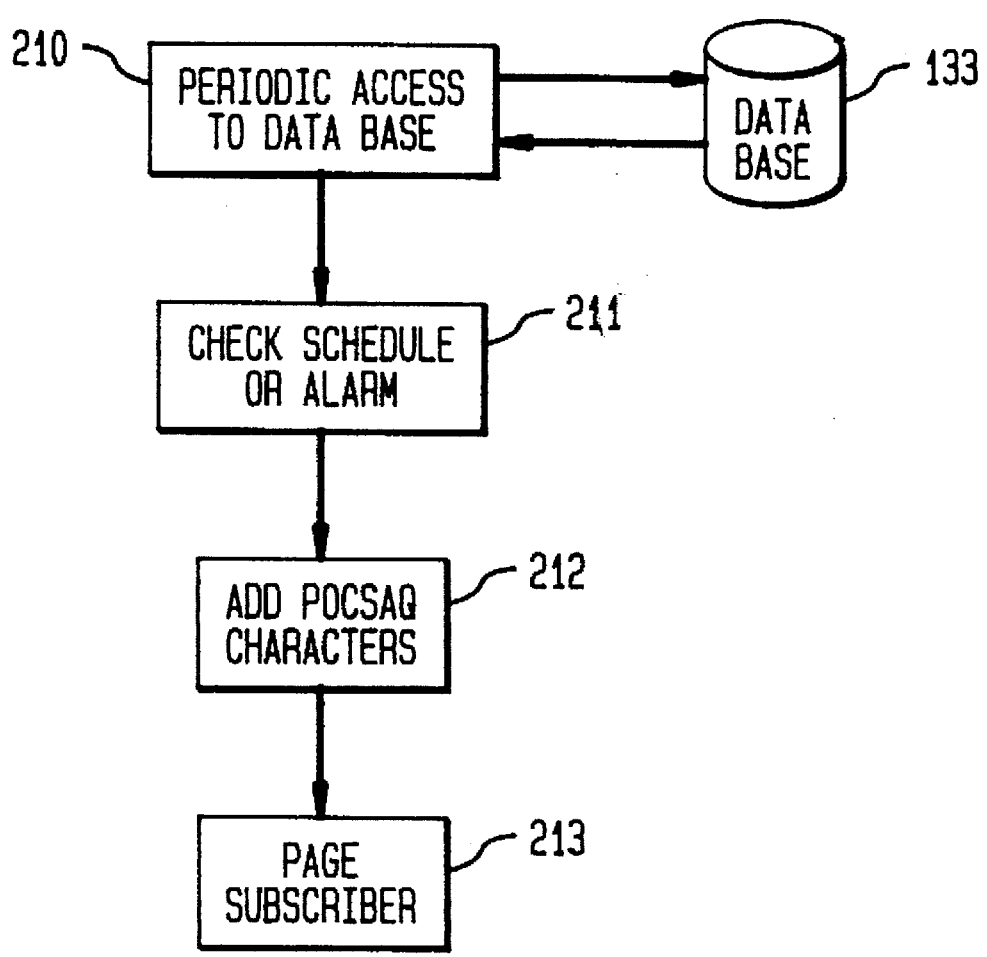

Referring now to FIG. 2B, there is shown an out-of-band signaling response when an alarm alert, or schedule change condition is detected by the central platform.

More particularly, periodic access to data base 133 is achieved at step 210, so that schedule changes alert, or alarm conditions, can be monitored and detected.

Schedule changes alert, or alarm conditions, are checked at step 211, and an appropriate page is formulated for the subscriber to indicate the occurrence of a schedule change, or an alarm condition. Any necessary POCSAG characters are added at step 212 and the subscriber is then paged at step 213, to notify him or her of the schedule change or alarm condition.

The schedule changes, alert, or alarm conditions may be part of a telephone system, or they may be part of any other information or communication system. For example, out-of-band signaling can be activated by a number of predetermined or trigger conditions such as: a page is sent when a telephone bill exceeds a certain amount, a page is sent when the stock market volume exceeds a certain volume, a page is sent when a business burglar alarm system is activated, and again when it is disabled, and/or a page is used by the telephone network for call set-up.

In this manner, the subscriber can be reminded of any schedule change, alarm, or alert conditions via an out-of-band signaling response on an ancillary path in response to predetermined trigger conditions.

The foregoing merely illustrates the principles of the invention. It will, thus, be appreciated that those skilled in the art will be able to devise various arrangements which, although not explicitly described or shown herein, embody the principles of the invention and are, thus, within its spirit and scope,

What is claimed is:

1. A method for use in a communication system for supplying to a first party, connected to a central platform, one or more messages transmitted as an out-of-band signal in response to predetermined trigger conditions, the method comprising the steps of:

storing information identifying said trigger conditions at said central platform, periodically accessing said stored information to determine the necessity to initiate the transmission of said out-of-band signal, formulating a particular message to be transmitted as an out-of-band signal in response to access of said stored information, and transmitting said particular message as an out-of-band signal to said first party, wherein said stored information identifying said trigger conditions includes predetermined schedule changes previously defined by said first party, wherein there is further included the step of adding predetermined characters to said message prior to transmitting said message as an out-of-band signal to said first party, said predetermined characters being added to said message in a predetermined order in accordance with a type of message to be transmitted, and wherein said transmitting step includes the steps of initiating a page as said out-of-band signal, and sending said page to said first party.

2. A method in accordance with claim 1, wherein said particular message is numeric and said step of adding predetermined characters to said message in said predetermined order includes surrounding said message with said predetermined characters.

3. A method in accordance with claim 2, wherein said predetermined characters to be surrounded include bracket symbols.

4. A method in accordance with claim 2, wherein said predetermined characters to be surrounded include dash symbols.

5. A method for use in a telephone system which provides communication between a caller and a subscriber, said method supplying to said subscriber, connected to a central platform, one or more messages transmitted as an out-of-band signal in response to preprogrammed conditions stored at said central platform, the method comprising the steps of, detecting the occurrence of events corresponding to at least one of said preprogrammed conditions specified by information stored at said central platform, determining whether an occurrence of said preprogrammed conditions requires said subscriber to be supplied with one or more of said messages, transmitting a first message to said subscriber, determining whether an answer is received from said subscriber in response to said first message, connecting said caller to said subscriber if an answer is received from said subscriber, providing to said caller one or more options if no answer is received from said subscriber, and transmitting a second message to said subscriber in response to at least one option chosen by said caller, wherein said step of transmitting said second message includes the step of adding predetermined characters to said second message to be transmitted, said predetermined characters being added in a predetermined order according to the option chosen.

6. A method in accordance with claim 5, wherein said providing step includes the step of storing information provided by said caller at said central platform.

7. A method in accordance with claim 6, wherein either of said transmitting steps includes the step of including in said second message said stored information provided by said caller.

8. A method in accordance with claim 6, wherein said stored information provided by said caller includes said caller's PIN designation.

9. A method in accordance with claim 5, wherein said particular message is numeric and said step of adding predetermined characters to said message in said predetermined order includes surrounding said message with said predetermined characters.

10. A method in accordance with claim 9, wherein said predetermined characters to be surrounded include bracket symbols.

11. A method in accordance with claim 9, wherein said predetermined characters to be surrounded include dash symbols.

* * * * *